No. 721,327. PATENTED FEB. 24, 1903.
G. E. RICKEL & J. W. POTTER.
GATE HINGE.
APPLICATION FILED NOV. 18, 1902.
NO MODEL.
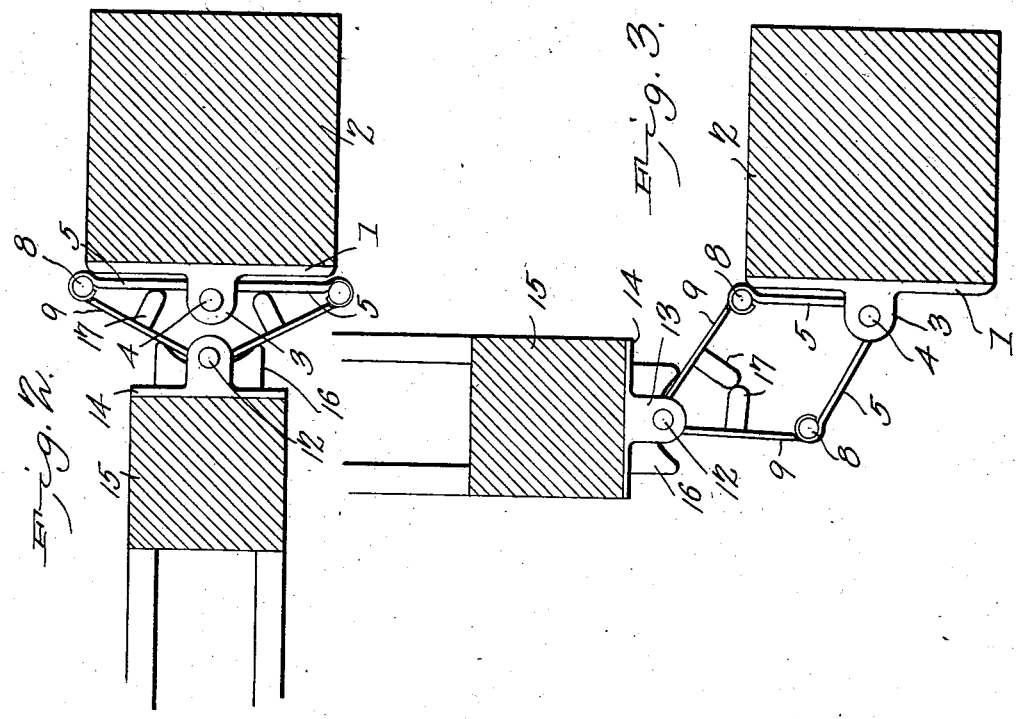
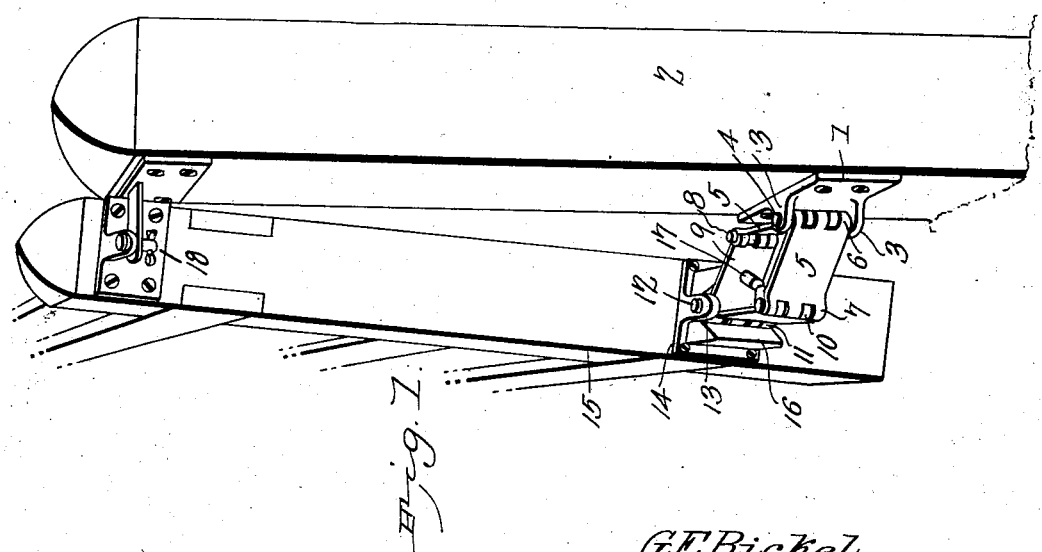

UNITED STATES PATENT OFFICE.

GEORGE E. RICKEL AND JOSEPH W. POTTER, OF OKETO, KANSAS.

GATE-HINGE.

SPECIFICATION forming part of Letters Patent No. 721,327, dated February 24, 1903.

Application filed November 18, 1902. Serial No. 131,895. (No model.)

*To all whom it may concern:*

Be it known that we, GEORGE E. RICKEL and JOSEPH W. POTTER, citizens of the United States, residing at Oketo, in the county of Marshall and State of Kansas, have invented a new and useful Gate-Hinge, of which the following is a specification.

The invention relates to improvements in gate-hinges.

The object of the present invention is to improve the construction of gate-hinges and to provide a simple and comparatively inexpensive one designed to be applied to the ordinary swinging gate and hinge-post and capable of enabling a gate to swing open in either direction and to cause the same to close automatically.

A further object of the invention is to provide simple and efficient means for limiting the swing of the gate and to support the leaves of the hinge when the gate is closed.

The invention consists in the construction and novel combination and arrangement of parts hereinafter fully described, illustrated in the accompanying drawings, and pointed out in the claims hereto appended.

In the drawings, Figure 1 is a perspective view of a portion of a gate provided with a hinge constructed in accordance with this invention. Fig. 2 is a horizontal sectional view, the gate being closed. Fig. 3 is a similar view illustrating the position of the parts when the gate is open.

Like numerals of reference designate corresponding parts in all the figures of the drawings.

1 designates a hinge-post plate or bracket designed to be bolted or otherwise secured to a post 2 and provided at its top and bottom with upper and lower perforated ears 3, receiving a pintle 4 for hinging rear leaves 5 to the bracket or plate 1. The rear leaves 5 are provided at their inner adjacent ends with eyes 6 to receive the pintle 4, and they have their upper and lower edges located between the perforated ears 3. The outer ends of the rear leaves are provided with eyes 7, which receive pintles 8 for hinging the said rear leaves to a pair of front leaves 9. The front leaves 9 are provided at their outer ends with eyes 10 for the reception of the said pintles 8, and they are also provided with inner eyes 11, which receive a front pintle 12. The front pintle 12 passes through perforated ears 13 of a bracket or plate 14, which is designed to be screwed, bolted, or otherwise secured to a gate 15. The rear leaves are arranged approximately in the same plane when the gate is closed, and the front leaves, which are longer than the rear leaves, are arranged at an angle to each other, forming an approximately V-shaped front portion. This V-shaped front portion of the hinge is supported when the gate is closed by a lug or enlargement 16 of the bracket or plate 14, the said lug or enlargement 16 being provided with a V-shaped recess to form a seat for the front leaves. When the gate is opened in either direction, the front leaf at the side on which the gate opens or to which the gate swings oscillates and causes the lower end of the gate to swing upward and outward, whereby the gate will close by gravity when released. The rear leaf at this side of the gate remains in contact with the hinge-post bracket or plate and affords a firm support for the adjacent front leaf. The other rear leaf swings away from the hinge bracket or plate 1, and the corresponding front leaf is carried outward by the gate, as clearly shown in Figs. 1 and 3.

In order to firmly brace the hinge when the gate is closed and to limit the swing of the gate in opening, a pair of lugs 17 is provided. These lugs, which may be mounted on the front leaves in any desired manner, extend rearward from the inner faces of the same and abut against the rear leaves when the gate is closed, as illustrated in Fig. 2 of the drawings, to prevent a heavy gate from crushing a light hinge. When the gate is swung open, the lugs engage each other, as illustrated in Fig. 3 of the drawings, to limit the opening movement of the gate, and thereby insure an automatic closing of the same. The lugs may of course be applied to the rear leaves, if desired.

Any desired form of upper hinge 18 may be employed; but a key or other suitable fastening device is provided to prevent the upper parts of the gate from separating when the bottom of the gate is swung upward and outward.

It will be seen that the means for bracing the hinge when the gate is closed is exceedingly simple and that it is adapted to limit the opening movement of the gate to insure an automatic closing of the same.

What is claimed is—

1. A hinge of the class described comprising brackets or plates designed to be mounted on a gate and on a suitable support, a pair of front and a pair of rear leaves hinged together at their outer ends and connected at their inner ends respectively to the said brackets or plates, one pair of leaves being longer than the other, and means for bracing the leaves when the gate is closed and for limiting the swing of the gate, substantially as described.

2. A hinge of the class described comprising brackets or plates, front and rear leaves arranged in pairs and hinged together at their outer ends and connected at their inner ends to the brackets or plates, one pair of leaves being longer than the other, and lugs projecting from one pair of leaves and engaging the other when the gate is closed, said lugs being arranged to engage each other and limit the swing of the gate, substantially as described.

In testimony that we claim the foregoing as our own we have hereto affixed our signatures in the presence of two witnesses.

GEORGE E. RICKEL.
    JOSEPH W. POTTER.

Witnesses:
 Z. H. MOORE,
 HENRY WATERS.